United States Patent
Takawaki et al.

(10) Patent No.: US 8,084,545 B2
(45) Date of Patent: Dec. 27, 2011

(54) PHOTO- AND/OR THERMO-CURABLE COPOLYMER, CURABLE RESIN COMPOSITIONS, AND CURED ARTICLES

(75) Inventors: Koichi Takawaki, Himeji (JP); Toshihiko Nijukken, Himeji (JP)

(73) Assignee: Daicel Chemical Industries, Ltd., Osaka-Shi (JP)

( * ) Notice: Subject to any disclaimer, the term of this patent is extended or adjusted under 35 U.S.C. 154(b) by 260 days.

(21) Appl. No.: 12/598,314

(22) PCT Filed: Mar. 31, 2008

(86) PCT No.: PCT/JP2008/000822
§ 371 (c)(1), (2), (4) Date: Oct. 30, 2009

(87) PCT Pub. No.: WO2008/139679
PCT Pub. Date: Nov. 20, 2008

(65) Prior Publication Data
US 2010/0137515 A1  Jun. 3, 2010

(30) Foreign Application Priority Data
May 11, 2007 (JP) ................................. 2007-127398

(51) Int. Cl.
*C08F 269/00* (2006.01)
(52) U.S. Cl. ..................................... 525/286; 525/327.3
(58) Field of Classification Search .............. 525/286, 525/327.3
See application file for complete search history.

(56) References Cited

U.S. PATENT DOCUMENTS

| | | | | |
|---|---|---|---|---|
| 5,002,977 A | * | 3/1991 | Seko et al. | 522/149 |
| 5,043,366 A | * | 8/1991 | Isozaki | 523/410 |
| 5,677,385 A | * | 10/1997 | Miyake et al. | 525/286 |
| 6,001,488 A | * | 12/1999 | Kataoka et al. | 428/447 |

FOREIGN PATENT DOCUMENTS

| | | |
|---|---|---|
| DE | 39 43 850 B4 | 11/1989 |
| EP | 1 818 327 A1 | 8/2007 |
| GB | 2 219 591 A | 12/1989 |
| JP | 55-71713 A | 5/1980 |
| JP | 8-325323 A | 12/1996 |
| JP | 10-69081 A | 3/1998 |
| JP | 2000-191737 A | 7/2000 |
| JP | 2000-338322 A | 12/2000 |
| JP | 2002-287353 A | 10/2002 |
| JP | 2006-77231 A | 3/2006 |
| JP | 2006-193718 A | 7/2006 |

OTHER PUBLICATIONS

Katsumi Maeda et al.; ArF Chemically Amplified Negative Resist Using Alicyclic Epoxy Polymer; Journal of Photopolymer Science and Technology; vol. 11; No. 3; pp. 507-512; Jan. 1, 1998.
Supplementary European Search Report dated Jul. 22, 2010 issued in corresponding European patent application No. 08720688.4.

* cited by examiner

*Primary Examiner* — Bernard Lipman
(74) *Attorney, Agent, or Firm* — Birch, Stewart, Kolasch & Birch, LLP

(57) ABSTRACT

Disclosed is a photo- and/or thermo-curable copolymer having polymerizable unsaturated groups in side chains, which is obtainable by reacting a copolymer (P) with an epoxy-containing polymerizable unsaturated compound (C), the copolymer (P) containing monomer units derived from a carboxyl-containing polymerizable unsaturated compound (A) and monomer units derived from at least one epoxy-containing polymerizable unsaturated compound (B) represented by following Formula (1) or (2), in which the epoxy group of the epoxy-containing polymerizable unsaturated compound (C) has been added to part of the carboxyl groups of the copolymer (P). In the formulae, $R^a$s each represent hydrogen or hydroxyl-substituted or -unsubstituted alkyl having 1 to 4 carbon atoms; and $R^b$s each represent single bond or alkylene having 1 to 18 carbon atoms which may contain heteroatom(s). The curable copolymer is highly stably synthesized and stored, has satisfactory curing properties, and permits both epoxy crosslinking and radical crosslinking.

[Chemical Formula 1]

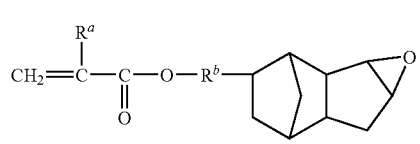

(1)

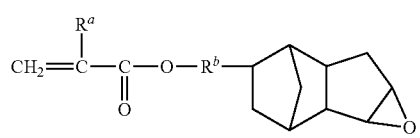

(2)

6 Claims, No Drawings

US 8,084,545 B2

PHOTO- AND/OR THERMO-CURABLE COPOLYMER, CURABLE RESIN COMPOSITIONS, AND CURED ARTICLES

TECHNICAL FIELD

The present invention relates to photo- and/or thermo-curable copolymers having carboxyl groups, epoxy groups, and polymerizable unsaturated groups in side chains; curable resin compositions containing the photo- and/or thermo-curable copolymers; and cured articles prepared from the curable resin compositions. The photo- and/or thermo-curable copolymers and curable resin compositions containing the copolymers are useful as materials for the formation typically of solder resists for printed wiring assemblies, resists for optical waveguides, liquid resists, and dry films, as well as photo-spacers, overfilms, color resists, black matrices, and dielectric films for use typically in liquid crystal displays.

BACKGROUND ART

Integration of devices with higher density and higher degree of integration has been generally increasingly demanded in the production of electronic devices requiring submicron micromachining, represented by very-large scale integrated circuits (VLSIs). More and more strict requirements have therefore been made on photolithographic technologies as processes for fine patterning. Independently, electronic components, such as liquid crystal display devices, integrated circuit devices, and solid-state image sensors, use various films such as protective films (overfilms) for preventing deterioration and damage of the components; interlayer dielectric films for insulating layered interconnections from each other; planarizing films for planarizing the surfaces of devices; and dielectric films for maintaining electrical insulation. Of such electronic components, thin-film transistor (TFT) liquid crystal display devices as representative of liquid crystal display devices are produced in the following manner. Initially, a back substrate is prepared by forming a polarizer on a glass substrate; forming a transparent electroconductive circuit layer made typically of indium-tin oxide (ITO) and thin-film transistors (TFTs) on the glass substrate; and covering these components with an interlayer dielectric film. Independently, a front substrate is prepared by forming a polarizer on a glass substrate; patterning a black matrix layer and a color filter layer on the glass substrate according to necessity; and sequentially forming a transparent electroconductive circuit layer and an interlayer dielectric film. The back substrate and the front substrate are arranged so as to face each other with the interposition of spacers, and a liquid crystal is encapsulated in between the two substrates to give a TFT liquid crystal display device. Photosensitive resin compositions (photoresist compositions) for use therein should excel in transparency, thermal stability, and developability and should give coatings with smooth surfaces.

As techniques for achieving higher sensitivity of resists, there are well known chemically amplified resists using light-activatable acid generators acting as photosensitizers. By way of example, a resin composition containing a light-activatable acid generator and a resin containing epoxy-containing structural units is exposed to light, to allow the light-activatable acid generator to generate a protonic acid, and the protonic acid acts to cleave the epoxy group to induce a crosslinking reaction. This makes the resin insoluble in a developer to form a pattern. Additionally, a heat treatment is conducted after light exposure to allow the acid to move in the resist solid pattern, and the acid thereby acts to catalytically amplify chemical changes typically of the resist resin. Thus, the resist can have a dramatically higher sensitivity as compared to known resists having a photo-reaction efficiency (reaction per one photon) of less than 1. Most of currently developed resists are chemically amplified resists, and the chemical amplification mechanism should essentially be employed for the development of high-sensitivity materials that correspond to light irradiation sources having shorter and shorter wavelengths.

Dielectric films to be arranged in thin-film transistor (TFT) liquid crystal display devices and integrated circuit devices are generally made from radiation-sensitive resin compositions, because they should undergo fine patterning or microprocessing. Such radiation-sensitive resin compositions should have high radiation sensitivity, so as to produce dielectric films with high productivity. The dielectric films for use in production of liquid crystal display devices and integrated circuit devices should also have superior solvent resistance. This is because dielectric films, if being not so resistant to solvents, may suffer from swelling (blistering), deformation, and delamination from the substrate by the action of organic solvents, and this may significantly impede the production of liquid crystal display devices and integrated circuit devices. Additionally, dielectric films arranged typically in liquid crystal display devices and solid-state image sensors should have high transparency according to necessity.

There has been proposed a vinyl copolymer resin having epoxy groups and carboxyl groups in side chains as a curable resin which is used in the above-mentioned applications and excels in storage stability and curing properties (for example, Patent Document 1). The curable resin has epoxy groups in side chains and permits crosslinking (epoxy crosslinking) by the action of a crosslinking agent having a functional group reactive with epoxy group. Independently, there has been proposed a vinyl copolymer resin as a curable resin for use in the above-mentioned applications. This resin has carboxyl groups in side chains, and an epoxy compound having a polymerizable unsaturated group has been added to part of the carboxyl groups (for example Patent Document 2). The resulting curable resin has polymerizable unsaturated groups in side chains and thereby permits radical crosslinking using a radical initiator.

However, there have been known few vinyl copolymer resins that have both epoxy groups and carboxyl groups in side chains, in which an epoxy compound having a polymerizable unsaturated group is added to part of the carboxyl groups. This is because, if such an epoxy compound having a polymerizable unsaturated group is reacted with a vinyl polymer having both epoxy groups and carboxyl groups in side chains, the epoxy groups originally contained in the vinyl polymer intramolecularly react with the carboxyl groups also contained in the vinyl polymer, and the resulting resin suffers from gelation during reaction, or a solution of the resin becomes excessively viscous, to fail to give a desired curable resin.

Patent Document 1: Japanese Unexamined Patent Application Publication (JP-A) No. 2006-193718
Patent Document 2: Japanese Unexamined Patent Application Publication (JP-A) No. 2000-191737

DISCLOSURE OF INVENTION

Problems to be Solved by the Invention

An object of the present invention is to provide a curable copolymer that can be stably synthesized and stored, has satisfactory curing properties, and permits both epoxy crosslinking and radical crosslinking; a curable resin composition containing the curable copolymer; and a cured article prepared through curing of the curable resin composition.

Another object of the present invention is to provide a curable resin composition that can give a cured article which is highly resistant to alkalis and solvents and has a high hardness; and a cured article prepared through curing of the curable resin composition.

Means for Solving the Problems

After intensive investigations to achieve the objects, the present inventors have found that a specific reaction gives, without gelation during the reaction, a curable copolymer which contains, in the molecule, not only carboxyl groups but also both epoxy groups capable of undergoing epoxy crosslinking and polymerizable unsaturated groups capable of undergoing radical crosslinking; that the specific reaction is an addition reaction of epoxy group of an epoxy-containing polymerizable unsaturated compound with part of carboxyl groups of a copolymer which is prepared through polymerization of a carboxyl-containing polymerizable unsaturated compound and a specific epoxy-containing polymerizable unsaturated compound; and that, in the reaction, an internal addition reaction between epoxy groups and carboxyl groups in the copolymer hardly proceeds but an addition reaction between the epoxy group of the epoxy-containing polymerizable unsaturated compound and the carboxyl groups of the copolymer proceeds. They further have found that the resulting curable copolymer can be highly stably stored and that curing of a curable composition containing the curable copolymer by the action of light or heat gives a cured article that is satisfactorily resistant to alkalis and solvents and has a high hardness. The present invention has been made based on these findings.

Specifically, the present invention provides a photo- and/or thermo-curable copolymer having polymerizable unsaturated groups in side chains, which is obtainable by reacting a copolymer (P) with an epoxy-containing polymerizable unsaturated compound (C), the copolymer (P) containing monomer units derived from a carboxyl-containing polymerizable unsaturated compound (A) and monomer units derived from at least one of epoxy-containing polymerizable unsaturated compounds (B) represented by following Formulae (1) and (2):

[Chemical Formula 1]

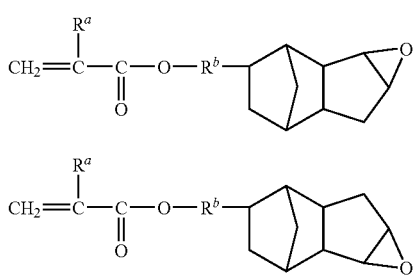

wherein $R^a$s each represent a hydrogen atom or hydroxyl-substituted or -unsubstituted alkyl group having 1 to 4 carbon atoms; and $R^b$s each represent a single bond or alkylene group having 1 to 18 carbon atoms which may contain heteroatom(s), in which the epoxy group of the epoxy-containing polymerizable unsaturated compound (C) has been added to part of the carboxyl groups of the copolymer (P).

The copolymer (P) may further contain monomer units derived from a carboxyl- and epoxy-free polymerizable unsaturated compound (D), in addition to the monomer units derived from the carboxyl-containing polymerizable unsaturated compound (A) and the monomer units derived from the epoxy-containing polymerizable unsaturated compound (B).

The carboxyl- and epoxy-free polymerizable unsaturated compound (D) can be, for example, at least one polymerizable unsaturated compound selected from the group of monomers consisting of (D1) styrene which may be substituted with alkyl or hydroxyl, (D2) an unsaturated carboxylic acid ester represented by following Formula (3):

[Chemical Formula 2]

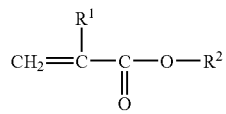

wherein $R^1$ represents a hydrogen atom or an alkyl group having 1 to 7 carbon atoms; $R^2$ represents one selected from a linear or branched-chain alkyl group having 1 to 18 carbon atoms, alkenyl group having 2 to 18 carbon atoms, an aryl group, an aralkyl group, a $—(R^3—O)_m—R^4$ group (wherein $R^3$ represents a bivalent hydrocarbon group having 1 to 12 carbon atoms, $R^4$ represents a hydrogen atom or a hydrocarbon group, and "m" denotes an integer of 1 or more), and a group with a monocyclic or polycyclic structure containing five or more members, and (D3) a N-substituted maleimide represented by following Formula (4):

[Chemical Formula 3]

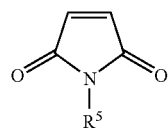

wherein $R^5$ represents one selected from a substituted or unsubstituted phenyl group, a substituted or unsubstituted aralkyl group, and a substituted or unsubstituted cycloalkyl group.

The present invention provides, in another embodiment, a curable resin composition containing the photo- and/or thermo-curable copolymer.

The curable resin composition may further contain a curing agent and/or a curing catalyst.

The present invention provides, in yet another embodiment, a cured article prepared through curing of the curable resin composition.

Advantages

Curable copolymers according to the present invention can be highly stably synthesized and stored, have satisfactory curing properties, and permit both epoxy crosslinking and radical crosslinking.

Curable resin compositions according to the present invention can give, through curing, cured articles that are highly resistant to alkalis and solvents and have a high hardness. They are therefore useful in uses such as solder resists for printed wiring assemblies, resists for optical waveguides, liquid resists, and dry films (dry film resists), as well as photo-spacers, overfilms, color resists, black matrices, and dielectric films for use in liquid crystal displays.

BEST MODES FOR CARRYING OUT THE INVENTION

A photo- and/or thermo-curable copolymer according to the present invention is a copolymer having polymerizable unsaturated groups in side chains. This curable copolymer is prepared by subjecting epoxy group of an epoxy-containing polymerizable unsaturated compound (C) to an addition reaction with part of carboxyl groups of a copolymer (P), which copolymer (P) contains monomer units derived from a carboxyl-containing polymerizable unsaturated compound (A) and monomer units derived from at least one of epoxy-containing polymerizable unsaturated compounds (B) represented by Formulae (1) and (2). The copolymer (P) contains a specific epoxy-containing cyclic structure, i.e., 3,4-epoxytricyclo[5.2.1.0$^{2,6}$]decane ring in the molecule. This epoxy group is resistant to the reaction with carboxyl groups in the copolymer, and this enables a smooth addition reaction between part of the carboxyl groups of the copolymer (P) and the epoxy-containing polymerizable unsaturated compound. Thus, the curable copolymer can be easily synthesized without suffering from gelation. The curable copolymer exhibits the function of dissolving in an alkaline developer because of having carboxyl groups in the molecule. In addition, the curable copolymer permits both epoxy crosslinking and radical crosslinking and has superior curing properties because of having both epoxy groups and polymerizable unsaturated groups in the molecule.

[Carboxyl-Containing Polymerizable Unsaturated Compound (A)]

The carboxyl-containing polymerizable unsaturated compounds (A) can be a monocarboxylic acid having a polymerizable unsaturated group; or a dicarboxylic acid having a polymerizable unsaturated group. Exemplary carboxyl-containing polymerizable unsaturated compounds (A) include aliphatic unsaturated monocarboxylic acids such as acrylic acid, methacrylic acid, and crotonic acid; aliphatic unsaturated dicarboxylic acids such as maleic acid, fumaric acid, citraconic acid, mesaconic acid, and itaconic acid; and modified unsaturated carboxylic acids in which a chain between an unsaturated group and a carboxyl group is extended, such as β-carboxyethyl (meth)acrylates, 2-acryloyloxyethylsuccinic acid, and 2-acryloyloxyethylphthalic acid. Exemplary carboxyl-containing polymerizable unsaturated compounds (A) usable herein further include compounds containing (meth) acrylic acid modified with a lactone, such as a compound represented by following Formula (5); compounds containing a hydroxyalkyl (meth)acrylate modified with a lactone, whose terminal hydroxyl group is further modified with an acid anhydride, such as a compound represented by following Formula (6); and compounds containing a polyetherpolyol ester of (meth)acrylic acid, whose terminal hydroxyl group is modified with an acid anhydride, such as a compound represented by following Formula (7).

[Chemical Formula 4]

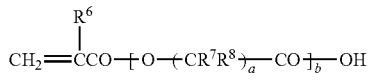

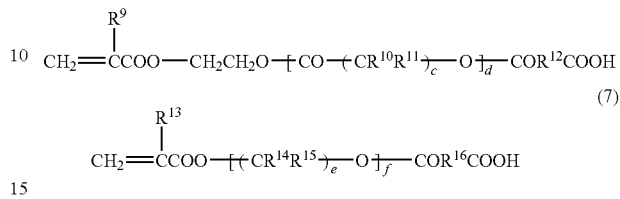

In Formula (5), $R^6$ represents hydrogen atom or methyl group; $R^7$ and $R^8$ are the same as or different from each other and each represent one of hydrogen atom, methyl group, and ethyl group; "a" denotes an integer of from 4 to 8; and "b" denotes an integer of from 1 to 10, where $R^7$s in the number of "a" may be the same as or different from one another, and $R^8$s in the number of "a" may be the same as or different from one another.

In Formula (6), $R^9$ represents hydrogen atom or methyl group; $R^{10}$ and $R^{11}$ are the same as or different from each other and each represent one of hydrogen atom, methyl group, and ethyl group; "c" denotes an integer of from 4 to 8; "d" denotes an integer of from 1 to 10; and $R^{12}$ represents one of a bivalent aliphatic saturated or unsaturated hydrocarbon group having 1 to 10 carbon atoms, bivalent alicyclic saturated or unsaturated hydrocarbon group having 3 to 6 carbon atoms, and substituted or unsubstituted bivalent arylene group, where $R^{10}$s in the number of "c" may be the same as or different from one another, and $R^{11}$s in the number of "c" may be the same as or different from one another.

In Formula (7), $R^{13}$ represents hydrogen atom or methyl group; $R^{14}$ and $R^{15}$ are the same as or different from each other and each represent one of hydrogen atom, methyl group, ethyl group, propyl group, and butyl group; "e" denotes an integer of from 1 to 10; "f" denotes an integer of from 1 to 10; and $R^{16}$ represents one of a bivalent aliphatic saturated or unsaturated hydrocarbon group having 1 to 10 carbon atoms, bivalent alicyclic saturated or unsaturated hydrocarbon group having 3 to 6 carbon atoms, and substituted or unsubstituted bivalent arylene group, where $R^{14}$s in the number of "e" may be the same as or different from one another, and $R^{15}$s in the number of "e" may be the same as or different from one another.

Examples of the bivalent aliphatic saturated or unsaturated hydrocarbon group having 1 to 10 carbon atoms include methylene, ethylene, ethylidene, propylene, isopropylidene, trimethylene, tetramethylene, pentamethylene, hexamethylene, octamethylene, decamethylene, and vinylene groups. Exemplary bivalent alicyclic saturated or unsaturated hydrocarbon groups having 3 to 6 carbon atoms include cyclopropylene, cyclobutylene, cyclopentylene, cyclohexylene, cyclopentylidene, and cyclohexylidene groups. Exemplary substituted or unsubstituted bivalent arylene groups include phenylene, tolylene, and xylylene groups.

The carboxyl-containing polymerizable unsaturated compounds (A) is preferably (meth)acrylic acid, at least one of compounds represented by Formulae (5) to (7) [of which a compound represented by Formula (5) is more preferred], or a combination of (meth)acrylic acid with at least one of compounds represented by Formulae (5) to (7) [of which a compound represented by Formula (5) is more preferred].

[Epoxy-Containing Polymerizable Unsaturated Compound (B)]

In Formulae (1) and (2) in the at least one epoxy-containing polymerizable unsaturated compound (B) represented by Formula (1) or (2), $R^a$s each independently represent hydrogen atom or hydroxyl-substituted or -unsubstituted alkyl group having 1 to 4 carbon atoms; $R^b$s each independently represent single bond or alkylene group having 1 to 18 carbon atoms which may contain heteroatom(s).

Exemplary alkyl groups having 1 to 4 carbon atoms include methyl, ethyl, propyl, isopropyl, butyl, isobutyl, and t-butyl groups. Exemplary hydroxyl-substituted alkyl groups having 1 to 4 carbon atoms include hydroxymethyl, 1-hydroxyethyl, 2-hydroxyethyl, 1-hydroxypropyl, 2-hydroxypropyl, 3-hydroxypropyl, 1-hydroxyisopropyl, 2-hydroxyisopropyl, 1-hydroxybutyl, 2-hydroxybutyl, 3-hydroxybutyl, and 4-hydroxybutyl groups. $R^a$s are each preferably one of hydrogen atom, methyl group, hydroxymethyl group, 1-hydroxyethyl group, and 2-hydroxyethyl group, and are each especially preferably hydrogen atom or methyl group.

In the alkylene group as $R^b$ which has 1 to 18 carbon atoms and may contain heteroatom(s), the heteroatom(s) may be bound at a terminal of the alkylene group or be present between carbon atoms constituting the alkylene group. Exemplary heteroatoms include nitrogen, oxygen, and sulfur atoms.

Representative examples of $R^b$ include a group represented by following Formula (8):

[Chemical Formula 5]

$$-(R^c-O)_{\overline{n}}- \quad (8)$$

wherein $R^c$ represents an alkylene group having 1 to 18 carbon atoms; and "n" denotes an integer of 0 or more, wherein the total number of carbon atoms present in the formula is from 0 to 18.

Exemplary alkylene groups having 1 to 18 carbon atoms, as $R^c$, include methylene, ethylene, propylene, trimethylene, tetramethylene, hexamethylene, octamethylene, decamethylene, dodecamethylene, tetradecamethylene, hexadecamethylene, and octadecamethylene groups. $R^c$ is preferably an alkylene group having 1 to 12 carbon atoms, such as methylene, ethylene, propylene, tetramethylene, or hexamethylene group, and is more preferably an alkylene group having 1 to 6 carbon atoms. The repetition number "n" is preferably an integer of from 0 to 10, more preferably an integer of from 0 to 4, and especially preferably 0 or 1.

Other representative examples of $R^b$ include alkylene groups having 1 to 18 carbon atoms, such as methylene group, ethylene group, propylene group, and trimethylene group, of which those having 1 to 12 carbon atoms are preferred, and those having 1 to 6 carbon atoms are more preferred; thioalkylene groups having 1 to 18 carbon atoms, such as thiomethylene group, thioethylene group, and thiopropylene group, of which those having 1 to 12 carbon atoms are preferred, and those having 1 to 6 carbon atoms are more preferred; and aminoalkylene groups having 1 to 18 carbon atoms, such as aminomethylene group, aminoethylene group, and aminopropylene group, of which those having 1 to 12 carbon atoms are preferred, and those having 1 to 6 carbon atoms are more preferred.

$R^b$ is preferably single bond [a group of Formula (8) in which "n" is 0]; an alkylene group having 1 to 6 carbon atoms (of which an alkylene group having 1 to 3 carbon atoms is more preferred); or an oxyalkylene group having 1 to 6 carbon atoms (of which an oxyalkylene group having 2 or 3 carbon atoms is more preferred) [a group of Formula (8) in which "n" is 1 and $R^c$ is an alkylene group having 1 to 6 carbon atoms (of which an alkylene group having 2 or 3 carbon atom is more preferred)]. $R^b$ is more preferably single bond or oxyethylene group.

Representative examples of epoxy-containing polymerizable unsaturated compounds represented by Formulae (1) and (2) (compounds containing a 3,4-epoxytricyclo[5.2.1.0$^{2,6}$] decane ring) include epoxidized dicyclopentenyl (meth)acrylates represented by following Formula (9) [i.e., 3,4-epoxytricyclo[5.2.1.0$^{2,6}$]dec-9-yl (meth)acrylates and 3,4-epoxytricyclo[5.2.1.0$^{2,6}$]dec-8-yl (meth)acrylates]; epoxidized dicyclopentenyloxyethyl (meth)acrylates represented by following Formula (10) [i.e., 2-(3,4-epoxytricyclo[5.2.1.0$^{2,6}$]dec-9-yloxy)ethyl (meth)acrylates and 2-(3,4-epoxytricyclo[5.2.1.0$^{2,6}$]dec-8-yloxy)ethyl (meth)acrylates]; epoxidized dicyclopentenyloxybutyl (meth)acrylates represented by following Formula (11); and epoxidized dicyclopentenyloxyhexyl (meth)acrylates represented by following Formula (12). Among them, epoxidized dicyclopentenyl (meth)acrylates and epoxidized dicyclopentenyloxyethyl (meth)acrylates are preferred. In the following formulae, $R^{a'}$ represents hydrogen atom or methyl group.

[Chemical Formula 6]

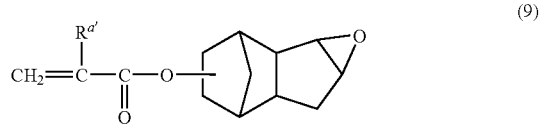

(9)

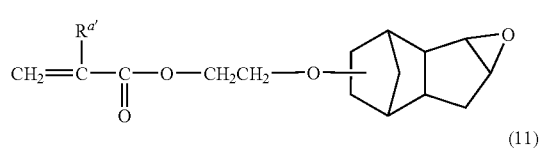

(10)

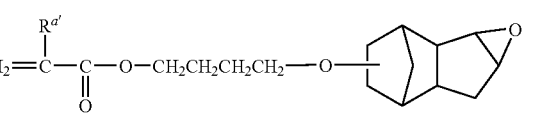

(11)

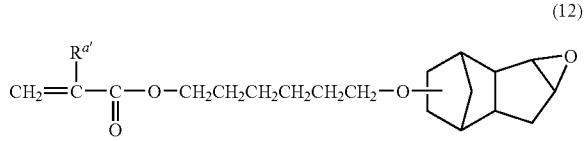

(12)

Each of a compound represented by Formula (1) and a compound represented by Formula (2) can be used alone or in combination in an arbitrary proportion. When the two compounds are used in combination, the ratio of the compound of Formula (1) to the compound of Formula (2) is preferably from 5:95 to 95:5, more preferably from 10:90 to 90:10, and furthermore preferably from 20:80 to 80:20.

[Carboxyl- and Epoxy-Free Polymerizable Unsaturated Compound (D)]

The copolymer (P) may further contain monomer units derived from a carboxyl- and epoxy-free polymerizable unsaturated compound (D), in addition to monomer units derived from the carboxyl-containing polymerizable unsaturated compound (A) and monomer units derived from the epoxy-containing polymerizable unsaturated compound (B). The monomer units derived from the carboxyl- and epoxy-free polymerizable unsaturated compound (D) have the function of imparting hardness necessary typically as a resist to the resulting film (coating). The polymerizable unsaturated compound (D) also helps a copolymerization reaction to proceed smoothly.

Preferred carboxyl- and epoxy-free polymerizable unsaturated compounds (D) usable herein include (D1) styrene which may be substituted with alkyl or hydroxyl; (D2) unsaturated carboxylic acid esters represented by Formula (3); and (D3) N-substituted maleimides represented by Formula (4). Each of these monomers can be used alone or in combination.

Exemplary styrenes (D1) which may be substituted with alkyl or hydroxyl include styrene, α-methylstyrene, vinyltoluene, and hydroxystyrene.

In Formula (3) in the unsaturated carboxylic acid esters (D2) represented by Formula (3), $R^1$ represents hydrogen atom or an alkyl group having 1 to 7 carbon atoms; $R^2$ represents one of a linear or branched-chain alkyl group having 1 to 18 carbon atoms, an alkenyl group having 2 to 18 carbon atoms, an aryl group, an aralkyl group, a —$(R^3$—$O)_m$—$R^4$ group (wherein $R^3$ represents a bivalent hydrocarbon group having 1 to 12 carbon atoms, $R^4$ represents a hydrogen atom or hydrocarbon group, and "m" denotes an integer of 1 or more), and a group with a monocyclic or polycyclic structure containing five or more members.

Examples of the alkyl group having 1 to 7 carbon atoms as $R^1$ include methyl, ethyl, propyl, isopropyl, butyl, isobutyl, t-butyl, and hexyl groups. $R^1$ is preferably hydrogen atom or methyl group.

As $R^2$, examples of the linear or branched-chain alkyl group having 1 to 18 carbon atoms include methyl, ethyl, propyl, isopropyl, butyl, isobutyl, t-butyl, hexyl, octyl, decyl, and dodecyl groups. Exemplary alkenyl groups having 2 to 18 carbon atoms include vinyl, allyl, 3-butenyl, and 5-hexenyl groups. Exemplary aryl groups include phenyl, naphthyl, and tolyl groups. Exemplary aralkyl groups include aralkyl groups having about 7 to 18 carbon atoms, such as benzyl, 1-phenylethyl, 2-phenylethyl, trityl, and 3-phenylpropyl groups.

In the —$(R^3$—$O)_m$—$R^4$ group as $R^2$, $R^3$ represents a bivalent hydrocarbon group having 1 to 12 carbon atoms; $R^4$ represents hydrogen atom or a hydrocarbon group; and "m" denotes an integer of 1 or more. Examples of the bivalent hydrocarbon group having 1 to 12 carbon atoms as $R^3$ include linear or branched-chain alkylene groups having 2 to 12 carbon atoms, such as ethylidene, ethylene, isopropylidene, trimethylene, propylene, tetramethylene, and hexamethylene groups, of which those having 2 to 6 carbon atoms are preferred; and bivalent alicyclic hydrocarbon groups having 3 to 6 members, such as cyclohexylene and cyclohexylidene groups. Exemplary hydrocarbon groups as $R^4$ include aliphatic hydrocarbon groups including alkyl groups such as methyl, ethyl, propyl, isopropyl, butyl, and hexyl groups, of which alkyl groups having 1 to 10 carbon atoms are preferred; alicyclic hydrocarbon groups including cycloalkyl groups such as cyclopentyl group and cyclohexyl group, and bridged carbocyclic groups such as norbornyl group (bicyclo[2.2.1] heptyl group) and tricyclo[5.2.1.0$^{2,6}$]decyl group; aryl groups such as phenyl and naphthyl groups; and bivalent groups each containing two or more of these groups bonded with each other. The repetition number "m" is preferably an integer of from 1 to 20, more preferably an integer of from 1 to 4, and especially preferably 1.

Examples of the group with a monocyclic or polycyclic structure containing five or more members, as $R^2$, include a group represented by following Formula (9):

—$X^1$—$R^{17}$                     (9)

wherein $R^{17}$ represents an alicyclic hydrocarbon group; and $X^1$ represents a single bond or linkage group.

As $R^{17}$, examples of the alicyclic hydrocarbon group include monocyclic alicyclic hydrocarbon groups including cycloalkyl groups having 5 to 15 members which may be substituted with alkyl group(s) having 1 to 6 carbon atoms, such as cyclopentyl group, cyclohexyl group, methylcyclohexyl group, and trimethylcyclohexyl group; and polycyclic alicyclic hydrocarbon groups (bridged hydrocarbon groups) having about 6 to 20 carbon atoms which may be substituted typically with alkyl group(s) having 1 to 6 carbon atoms, such as bicyclo[2.2.1]hept-2-yl group (i.e., norborn-2-yl group), isobornyl group, tricyclo[5.2.1.0$^{2,6}$]dec-9-yl group, tricyclo [5.2.1.0$^{2,6}$]dec-8-yl group, tricyclo[4.4.0.1$^{2,5}$]undec-3-yl group, tricyclo[4.4.0.1$^{2,5}$]undec-4-yl group, tetracyclo [4.4.0.1$^{2,5}$.1$^{7,10}$]dodec-3-yl group, tetracyclo[4.4.0.1$^{2,5}$.1$^{7,10}$]dodec-4-yl group, and adamant-1-yl group. Among them, preferred are polycyclic alicyclic hydrocarbon groups (bridged hydrocarbon groups) having about 6 to about 20 carbon atoms which may be substituted typically with alkyl groups) having 1 to 6 carbon atoms.

Exemplary linkage groups as $X^1$ include linear or branched-chain alkylene groups having about 1 to about 12 carbon atoms, such as methylene, ethylidene, ethylene, isopropylidene, trimethylene, propylene, tetramethylene, and hexamethylene groups, of which those having about 1 to 6 carbon atoms are preferred; bivalent alicyclic hydrocarbon groups having 3 to 6 members, such as cyclohexylene and cyclohexylidene groups; bivalent aromatic hydrocarbon groups having about 6 to 15 carbon atoms, such as phenylene group; oxygen atom (ether bond); sulfur atom (thioether bond); —NH—; carbonyl group (—CO—); and bivalent groups each containing two or more of these groups bonded with each other, including oxyalkylene groups such as —CH$_2$CH$_2$O—, —CH$_2$CH$_2$CH$_2$CH$_2$O—, and —CH$_2$CH$_2$CH$_2$CH$_2$CH$_2$CH$_2$O—. Preferred examples as $X^1$ include single bond, linear or branched-chain alkylene groups having 1 to 6 carbon atoms, oxyalkylene groups, and groups each containing two or more of oxyalkylene groups bonded with each other.

Examples of the group with a monocyclic or polycyclic structure containing five or more members as $R^2$ further include lactone-ring-containing groups. Exemplary lactone-ring-containing groups include a group represented by following Formula (10):

—$X^2$—$R^{18}$                     (10)

wherein $R^{18}$ represents a lactone-ring-containing cyclic group; and $X^2$ represents a single bond or linkage group.

Examples of the lactone-ring-containing cyclic group as $R^{18}$ include monocyclic cyclic groups each containing a lactone ring having 5 to 15 members (of which one having 5 or 6 members is preferred) alone, such as γ-butyrolactone ring, δ-valerolactone ring, and ∈-caprolactone ring; and polycyclic cyclic groups, in which a lactone ring having 5 to 15 members (of which one having 5 or 6 members is preferred) and an alicyclic ring are fused, such as norbornane lactone ring (i.e., 3-oxatricyclo[4.2.1.0$^{4,8}$]nonan-2-one ring), 6-oxabicyclo[3.2.1]octan-7-one ring, 8-oxabicyclo[4.3.0$^{1,6}$] nonan-7-one ring, and 4-oxatricyclo[5.2.1.0$^{2,6}$]decan-3-one ring. Exemplary linkage groups as $X^2$ include those exemplified as the linkage group as $X^1$.

Representative examples of the unsaturated carboxylic acid ester (D2) represented by Formula (3) include alkyl (meth)acrylates whose alkyl moiety having 1 to 18 carbon atoms, such as methyl (meth)acrylates, ethyl (meth)acrylates, propyl (meth)acrylates, butyl (meth)acrylates, isobutyl (meth)acrylates, hexyl (meth)acrylates, octyl (meth)acrylates, 2-ethylhexyl (meth)acrylates, and stearyl (meth)acrylates; aryl (meth)acrylates such as phenyl (meth)acrylates; aralkyl (meth)acrylates such as benzyl (meth)acrylates; hydroxyalkyl (meth)acrylates such as 2-hydroxyethyl (meth) acrylates and 2-hydroxypropyl (meth)acrylates; alkyl- or aryl-substituted oxypolyalkylene glycol (meth)acrylates such as methoxydiethylene glycol (meth)acrylates, ethoxydiethylene glycol (meth)acrylates, isooctyloxydiethylene glycol (meth)acrylates, phenoxytriethylene glycol (meth)acrylates, and methoxytriethylene glycol (meth)acrylates; aryloxyalkyl (meth)acrylates such as 2-phenyloxyethyl (meth)acrylates; (meth)acrylates containing an alicyclic carbocycle, such as trimethylcyclohexyl (meth)acrylates, isobornyl (meth)acrylates, tricyclo[5.2.1.0$^{2,6}$]dec-9-yl (meth)acrylates, tricyclo[5.2.1.0$^{2,6}$]dec-8-yl (meth)acrylates, 2-(tricyclo[5.2.1.0$^{2,6}$]dec-9-yloxy)ethyl (meth)acrylates, 2-(tricyclo[5.2.1.0$^{2,6}$]dec-8-yloxy)ethyl (meth)acrylates, 4-(tricyclo[5.2.1.0$^{2,6}$]dec-9-yloxy)butyl (meth)acrylates, 4-(tricyclo[5.2.1.0$^{2,6}$]dec-8-yloxy)butyl (meth)acrylates, 6-(tricyclo[5.2.1.0$^{2,6}$]dec-9-yloxy)hexyl (meth)acrylates, 4-(tricyclo[5.2.1.0$^{2,6}$]dec-8-yloxy)hexyl (meth)acrylates, and adamantyl (meth)acrylates; and lactone-ring-containing (meth)acrylates such as γ-butyrolactone-2-yl (meth)acrylates, γ-butyrolactone-3-yl (meth)acrylates, γ-butyrolactone-4-yl (meth)acrylates, and norbornane lactone (meth)acrylates.

Of unsaturated carboxylic acid esters (D2) represented by Formula (3), preferred are alkyl (meth)acrylates whose alkyl moiety having 1 to 4 carbon atoms, aralkyl (meth)acrylates, and hydroxyalkyl (meth)acrylates such as hydroxyalkyl (meth)acrylates whose alkyl moiety having 2 to 6 carbon atoms, of which aralkyl (meth)acrylates are more preferred.

In Formula (4) regarding the N-substituted maleimides (D3) represented by Formula (4), $R^5$ represents one of a substituted or unsubstituted phenyl group, a substituted or unsubstituted aralkyl group, and a substituted or unsubstituted cycloalkyl group. Exemplary substituents herein include alkyl groups having 1 to 4 carbon atoms, such as methyl group; alkoxy groups having 1 to 4 carbon atoms, such as methoxy group; hydroxyl groups; and carboxyl groups. Exemplary substituted or unsubstituted phenyl groups include phenyl, naphthyl, and tolyl groups. Exemplary substituted or unsubstituted aralkyl groups include benzyl, p-methylbenzyl, and 2-phenylethyl groups. Exemplary substituted or unsubstituted cycloalkyl groups include cycloalkyl groups having 3 to 8 members, such as cyclopropyl, cyclopentyl, cyclohexyl, and cyclooctyl groups.

Representative examples of the N-substituted maleimides (D3) represented by Formula (4) include N-cycloalkylmaleimides such as N-cyclopentylmaleimide, N-cyclohexylmaleimide, and N-cyclooctylmaleimide; N-arylmaleimides such as N-phenylmaleimide; and N-aralkylmaleimides such as N-benzylmaleimide.

Examples of the polymerizable unsaturated compound (D) usable herein further include unsaturated dicarboxylic acid diesters such as dimethyl maleate; as well as acrylonitrile, methacrylonitrile, vinyl chloride, vinylidene chloride, acrylamide, methacrylamide, vinyl acetate, 1,3-butadiene, and isoprene.

The proportions of respective monomer units in the copolymer (P) can be suitably chosen according to the intended use and desired characteristic properties. The proportion of monomer units derived from the carboxyl-containing polymerizable unsaturated compound (A) in the copolymer (P) is, for example, from about 5 to about 95 percent by weight, preferably from about 10 to about 80 percent by weight, and more preferably from about 15 to about 70 percent by weight, based on the amount of total monomer units constituting the polymer. The proportion of monomer units derived from the epoxy-containing polymerizable unsaturated compound (B) in the copolymer (P) is, for example, from about 5 to about 95 percent by weight, preferably from about 10 to about 90 percent by weight, and more preferably from about 15 to about 85 percent by weight, based on the amount of total monomer units constituting the polymer. The proportion of monomer units derived from the carboxyl- and epoxy-free polymerizable unsaturated compound (D) in the copolymer (P) is generally from about 0 to about 70 percent by weight (e.g., from about 1 to about 70 percent by weight), preferably from about 0 to about 60 percent by weight (e.g., from about 3 to about 60 percent by weight), and more preferably from about 0 to about 50 percent by weight (e.g., from about 5 to about 50 percent by weight), based on the amount of total monomer units constituting the polymer.

The copolymer (P) can be prepared by subjecting a monomer mixture to copolymerization, which monomer mixture contains the carboxyl-containing polymerizable unsaturated compound (A), the epoxy-containing polymerizable unsaturated compound (B), and, where necessary, the carboxyl- and epoxy-free polymerizable unsaturated compound (D).

One or more regular radical-polymerization initiators can be used as a polymerization initiator in the copolymerization. Examples thereof include azo compounds such as 2,2'-azobisisobutyronitrile, 2,2'-azobis(2,4-dimethylvaleronitrile), 2,2'-azobis(4-methoxy-2,4-dimethylvaleronitrile), dimethyl-2,2'-azobis(2-methyl propionate), diethyl-2,2'-azobis(2-methyl propionate), and dibutyl-2,2'-azobis(2-methyl propionate); organic peroxides such as benzoyl peroxide, lauroyl peroxide, t-butyl peroxypivalate, and 1,1-bis(t-butylperoxy) cyclohexane; and hydrogen peroxide. A peroxide, if used as a radical-polymerization initiator, may be used in combination with a reducing agent to form a redox initiator. Among such initiators, azo compounds are preferred, of which 2,2'-azobisisobutyronitrile, 2,2'-azobis(2,4-dimethylvaleronitrile), and dimethyl-2,2'-azobis(2-methyl propionate) are more preferred.

The amount of polymerization initiators can be suitably set within ranges not impeding smooth copolymerization and is generally from about 0.5 to about 20 percent by weight, and preferably from about 1 to about 15 percent by weight, based on the total amount of the monomers (total monomer components) and polymerization initiators.

The copolymerization can be performed according to a common process for use in the production of styrenic polymers or acrylic polymers, such as solution polymerization, bulk polymerization, suspension polymerization, bulk-suspension polymerization, or emulsion polymerization. Among them, solution polymerization is preferably employed. The monomers and polymerization initiators may be fed to the reaction system at once, or part or all of them may be added dropwise to the reaction system. Exemplary processes usable herein include a process of adding a solution of the polymerization initiator in a polymerization solvent dropwise to a mixture of the monomers and a polymerization solvent held at a predetermined temperature, to carry out polymerization; and a process of adding a solution of the monomers and polymerization initiator in a polymerization solvent dropwise to the polymerization solvent, to carry out polymerization (dropping polymerization).

The polymerization solvent can be suitably chosen according typically to the composition (formulation) of monomers. Exemplary polymerization solvents include ethers (e.g., chain ethers such as diethyl ether; glycol ethers such as 3-methoxy-1-butanol, propylene glycol monomethyl ether, diethylene glycol ethyl methyl ether, dipropylene glycol dimethyl ether, tripropylene glycol methyl ether, propylene glycol n-propyl ether, dipropylene glycol n-propyl ether, propylene glycol n-butyl ether, dipropylene glycol n-butyl ether, tripropylene glycol n-butyl ether, propylene glycol phenyl ether; and cyclic ethers such as tetrahydrofuran and dioxane), esters (e.g., methyl acetate, ethyl acetate, butyl acetate, ethyl lactate, ethyl lactate acetate, methyl lactate acetate, cyclohexanol acetate, furfuryl alcohol acetate, ethyl-3-ethoxy propionate, and dimethyl 2-acetoxy-2-methylmalonate; and glycol diesters and glycol ether esters, such as 3-methoxybutyl acetate, propylene glycol diacetate, 1,6-hexanediol diacetate, 1,3-butanediol diacetate, 1,3-butylene glycol diacetate, 1,4-butanediol diacetate, propylene glycol monomethyl ether acetate, and dipropylene glycol methyl ether acetate), ketones (e.g., acetone, methyl ethyl ketone, methyl isobutyl ketone, and cyclohexanone), amides (e.g., N,N-dimethylacetamide and N,N-dimethylformamide), sulfoxides (e.g., dimethyl sulfoxide), alcohols (e.g., methanol, ethanol, and propanol), hydrocarbons (e.g., aromatic hydrocarbons such as benzene, toluene, and xylenes; aliphatic hydrocarbons such as hexane; and alicyclic hydrocarbons such as cyclohexane), lactones (e.g., γ-butyrolactone), and mixtures of these solvents. The polymerization temperature can be suitably set within a range of typically from about 30° C. to about 150° C.

The copolymer (P) can be prepared by the above process. The weight-average molecular weight of the copolymer (P) is, for example, from about 2000 to about 50000, preferably from about 3500 to about 40000, and more preferably from about 4000 to about 30000. The dispersion (molecular weight distribution; the ratio of the weight-average molecular weight Mw to the number-average molecular weight Mn) of the copolymer (P) is, for example, from about 1 to about 3, and preferably from about 1 to about 2.5.

The acid value of the copolymer (P) ranges, for example, from 20 to 550 mg KOH/g, and preferably from 50 to 400 mg KOH/g.

The copolymer (P) may be isolated according to a known procedure such as reprecipitation before being subjected to the subsequent addition reaction. However, it is also acceptable to subject the polymerization reaction mixture as a solution to the subsequent addition reaction without any treatment or after a treatment such as concentration, dilution, or solvent exchange.

[Epoxy-Containing Polymerizable Compound (C)]

The epoxy-containing polymerizable unsaturated compound (C) to be subjected to an addition reaction with part of the carboxyl groups of the copolymer (P) has only to be a compound having a radically polymerizable unsaturated group and an epoxy group in the molecule. Examples thereof include polymerizable unsaturated compounds having a glycidyl group; and polymerizable unsaturated compounds having an alicyclic epoxy group. Each of different epoxy-containing polymerizable unsaturated compounds (C) can be used alone or in combination.

Exemplary polymerizable unsaturated compounds having a glycidyl group include glycidyl methacrylate, β-methylglycidyl methacrylate, allyl glycidyl ether, 2-hydroxyethyl acrylate glycidyl ether, and 4-hydroxybutyl acrylate glycidyl ether. Exemplary polymerizable unsaturated compounds having an alicyclic epoxy group include following compounds (C-1) to (C-11):

[Chemical Formula 7]

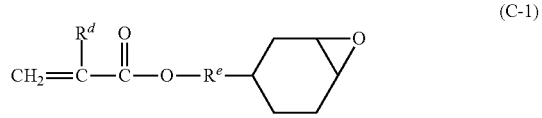
(C-1)

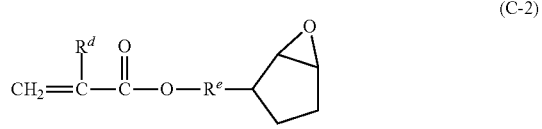
(C-2)

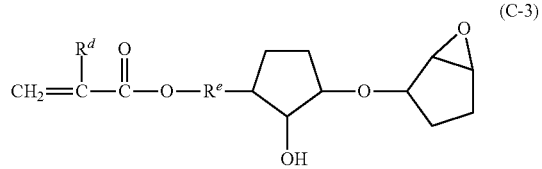
(C-3)

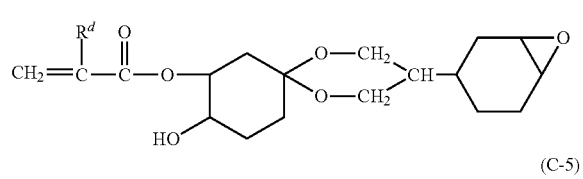
(C-4)

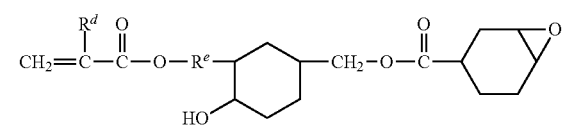
(C-5)

[Chemical Formula 8]

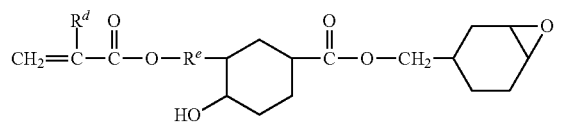
(C-6)

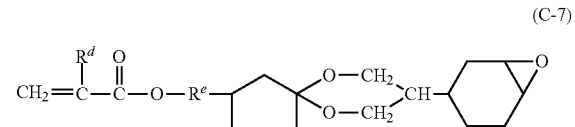
(C-7)

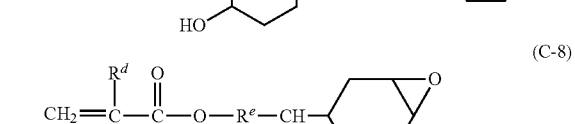
(C-8)

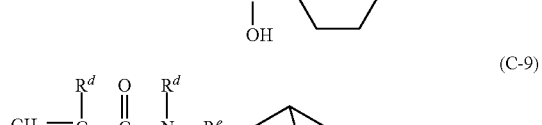
(C-9)

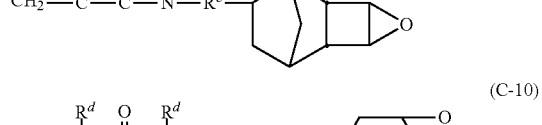
(C-10)

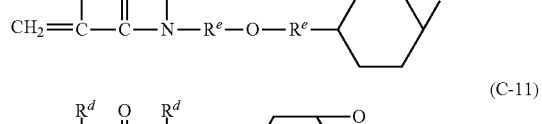
(C-11)

In these formulae, $R^d$s each represents hydrogen atom or methyl group; and $R^e$s each represents an alkylene group having 1 to 6 carbon atoms. Exemplary alkylene groups having 1 to 6 carbon atoms include linear or branched-chain alkylene groups such as methylene, ethylidene, ethylene, isopropylidene, trimethylene, propylene, tetramethylene, and hexamethylene groups.

The epoxy-containing polymerizable unsaturated compound (C) can be the compound represented by Formula (1) or (2) but is preferably an epoxy-containing polymerizable unsaturated compound other than the compounds represented by Formula (1) and (2), because these compounds show low addition reaction rates.

[Photo- and/or Thermo-Curable Copolymer]

A photo- and/or thermo-curable copolymer according to the present invention having polymerizable unsaturated groups in side chains (hereinafter simply also referred to as a "curable polymer according to the present invention"), is prepared by subjecting the epoxy group of the epoxy-containing polymerizable unsaturated compound (C) to an addition reaction with part of the carboxyl groups of the copolymer (P).

The amount of the epoxy group of the epoxy-containing polymerizable unsaturated compound (C) to be added to part of the carboxyl groups of the copolymer (P) is preferably within a range of, for example, from 5 to 95 percent by mole, and more preferably from 20 to 80 percent by mole, relative to the total amount of carboxyl groups of the copolymer (P). If the epoxy group is added in an amount of less than 5 percent by mole, the resulting copolymer may be insufficient in curability, such as curability by the action of active energy ray or curability by the action of heat, and the resulting cured film (cured coating) may have insufficient properties. In contrast, if the epoxy group is added in an amount of more than 95 percent by mole, it may take much time to carry out the addition reaction and the synthesis may often become unstable.

A catalyst is preferably used in the addition reaction between part of the carboxyl groups of the copolymer (P) and the epoxy group of the epoxy-containing polymerizable unsaturated compound (C). Exemplary catalysts include tertiary amines such as dimethylbenzylamine, triethylamine, tetramethylethylenediamine, tri-n-octylamine, and 1,8-diazabicyclo[5.4.0]undecene-7 (DBU); quaternary ammonium salts such as tetramethylammonium chloride, tetramethylammonium bromide, and tetrabutylammonium bromide; alkylureas such as tetramethylurea; alkylguanidines such as tetramethylguanidine; cobalt naphthenate and other metallic compounds, of which metal salts are preferred; organic metal complexes; and triphenylphosphine and other phosphine compounds, of which tertiary phosphines are preferred. Each of different catalysts can be used alone or in combination.

Though varying depending on the type of the catalyst, the amount of the catalyst is generally from about 0.01 to about 30 percent by weight, preferably from about 0.1 to about 25 percent by weight, and more preferably from about 1 to about 20 percent by weight, relative to the amount of the epoxy-containing polymerizable unsaturated compound (C). The catalyst may be deactivated or removed according to a known procedure at an adequate stage after the addition reaction, because the catalyst, if remains in the product, may cause troubles upon use of the prepared curable copolymer.

The addition reaction is generally performed in the presence of a solvent. The solvent is not especially limited, as long as raw materials can be dissolved therein, and any of the solvents listed as the polymerization solvent is usable. Naturally, the other solvents are also usable as the solvent herein.

The addition reaction is performed at a reaction temperature of, for example, from about 10° C. to about 150° C., and preferably from about 60° C. to about 100° C. A polymerization inhibitor may be present in the system during the addition reaction, to inhibit gelation caused by polymerization of polymerizable unsaturated groups. Exemplary polymerization inhibitors include hydroquinone, hydroquinone monomethyl ether, and phenothiazine. For the same reason, the addition reaction is preferably performed in an oxygen atmosphere. The oxygen concentration is preferably such that an explosive mixture is not formed in the reaction system, and is generally controlled within a range from 1% to 9%.

The acid value of a curable copolymer according to the present invention obtained through the addition reaction is within a range of, for example, from 10 to 350 mg KOH/g, and preferably from 20 to 200 mg KOH/g. The curable copolymer, if having an acid value of less than 10 mg KOH, may not be satisfactorily soluble in alkaline developers and may often show insufficient developability; and, in contrast, the curable copolymer, if having an acid value of more than 350 mg KOH/g, may often give a cured film (cured article) having insufficient water-proof and electric properties. The double-bond equivalent [weight (g) of the resin per 1 mole of unsaturated groups] of the curable polymer according to the present invention is, for example, from about 300 to about 4000, and preferably from about 500 to about 2000. The curable polymer, if having an excessively low double-bond equivalent, may be liable to shrink upon curing; and, if having an excessively high double-bond equivalent, may often give a cured film having insufficient strength.

The weight-average molecular weight of the curable copolymer according to the present invention is, for example, from about 2000 to about 50000, preferably from about 3500 to about 40000, and more preferably from about 4000 to about 30000. The curable copolymer, if having an excessively low weight-average molecular weight, may show insufficient tack freeness and give a coating after exposure having insufficient resistance to moisture, and the coating may often suffer from reduction in its thickness during development, accompanied with low resolution. In contrast, the curable copolymer, if having an excessively high weight-average molecular weight, may often show insufficient developability and may often become unstable during storage. The molecular weight distribution (ratio of weight-average molecular weight Mw to number-average molecular weight Mn) of the curable copolymer according to the present invention is, for example, from about 1 to about 3, and preferably from about 1 to about 2.5.

The resulting curable copolymer according to the present invention may be isolated according to a known procedure, such as reprecipitation, before being subjected to the preparation of a curable resin composition. However, it is also acceptable to subject the reaction mixture after addition reaction to the preparation of a curable resin composition without any treatment or after a treatment such as dilution, concentration, solvent exchange, or filtration.

The curable copolymers according to the present invention intramolecularly contain carboxyl groups, cyclic structures containing epoxy groups, i.e., 3,4-epoxytricyclo[5.2.1.0$^{2,6}$] decane rings, and polymerizable unsaturated groups. The carboxyl groups are derived from the carboxyl-containing polymerizable unsaturated compound (A) and are carboxyl groups which have not participated in the addition reaction. The cyclic structures containing epoxy groups are derived from the epoxy-containing polymerizable unsaturated compounds (B) represented by Formula (1) and/or (2). The polymerizable unsaturated groups are derived from the epoxy-containing polymerizable unsaturated compound (C). When the resin composition is used typically as a resist resin, the carboxyl groups function as alkali-soluble groups that will be dissolved in alkaline developers. They also function as crosslinking points that will react with crosslinking agents having reactivity with carboxyl groups. The epoxy groups function as crosslinking points that will react, typically through cationic polymerization, with crosslinking agents having reactivity with epoxy groups. The polymerizable unsaturated groups function as crosslinking points that will react with crosslinking agents having reactivity with free radicals. Such curable copolymers according to the present invention are usable in a wide variety of uses, because they intramolecularly have different types of functional groups having different functions and reaction properties and can thereby give cured articles having properties varying in a wide range, by suitably choosing the proportions of the carboxyl groups, epoxy groups, and polymerizable unsaturated groups according to the intended use and desired properties of cured articles.

[Curable Resin Composition]

A curable resin composition according to the present invention contains the curable copolymer according to the present invention. The curable resin composition according to the present invention may further contain other components according to the intended use. Examples of the other components include solvents; curing agents and curing catalysts for curing (crosslinking) the epoxy groups; photoinitiators for the polymerization of the polymerizable unsaturated groups; and radically reactive diluents such as diluting monomers and oligomers.

The content of the curable copolymer in the curable resin composition is, for example, from about 5 to about 95 percent by weight, preferably from about 10 to about 90 percent by weight, more preferably from about 30 to about 90 percent by weight, and especially preferably from about 50 to about 90 percent by weight, based on the total amount of components in the curable resin composition, except for the solvent.

The solvent for use herein can be chosen from the solvents exemplified as the polymerization solvent, as well as from various other solvents according to the intended use. Among them, esters, ketones, and ethers are preferred. Each of different solvents can be used alone or in combination. From the point typically of satisfactory coatability, the content of the solvent is preferably from about 60 to about 90 percent by weight, and more preferably from about 70 to about 85 percent by weight, based on the total amount of the curable resin composition.

Exemplary curing agents include epoxy resins, phenolic resins, and acid anhydrides.

The epoxy resins are not especially limited, as long as being resins having two or more epoxy groups per molecule (multifunctional epoxy resins), and examples thereof include bisphenol-A epoxy resins, bisphenol-F epoxy resins, bisphenol-S epoxy resins, phenol novolac epoxy resins, cresol novolac epoxy resins, brominated bisphenol-A, and other glycidyl ether epoxy resins, dimer acid diglycidyl ester, and phthalic acid diglycidyl ester. Multifunctional alicyclic epoxy resins are also usable as the epoxy resins. Each of different epoxy resins can be used alone or in combination. The amount of the epoxy resins can be suitably chosen within a range of, for example, from about 0 to about 30 parts by weight, and preferably from about 5 to about 30 parts by weight, per 100 parts by weight of the curable copolymer according to the present invention.

Exemplary usable phenolic resins include resins prepared through polymerization of phenol or cresol with formaldehyde. The resins can also be resins further copolymerized with an alicyclic compound or aromatic compound such as dicyclopentadiene, naphthalene, or biphenyl. The amount of phenolic resins can be suitably chosen within a range of, for example, from about 0 to about 200 parts by weight, and preferably from about 5 to about 20 parts by weight, per 100 parts by weight of the curable copolymer according to the present invention. The amount of phenolic resins may also be such that the amount of phenolic hydroxyl groups is from about 0 to about 1.8 moles (e.g., from about 0.1 to about 1.8 moles), per 1 mole of epoxy groups of the curable copolymer according to the present invention.

Examples of the acid anhydrides include anhydrides of polybasic acids, such as phthalic anhydride, trimellitic anhydride, pyromellitic anhydride, benzophenonetetracarboxylic anhydride, $\Delta^4$-tetrahydrophthalic anhydride, 4-methyl-$\Delta^4$-tetrahydrophthalic anhydride, 3-methyl-$\Delta^4$-tetrahydrophthalic anhydride, nadic anhydride (5-norbornene-endo-2,3-dicarboxylic anhydride), methylnadic anhydride, hydrogenated methylnadic anhydride, 4-(4-methyl-3-pentenyl)tetrahydrophthalic anhydride, succinic anhydride, adipic anhydride, maleic anhydride, sebacic anhydride, dodecanedioic anhydride, methylcyclohexenetetracarboxylic anhydride, dodecenylsuccinic anhydride, hexahydrophthalic anhydride, 4-methylhexahydrophthalic anhydride, 3-methylhexahydrophthalic anhydride, vinyl ether-maleic anhydride copolymers, and alkylstyrene-maleic anhydride copolymers. The amount of acid anhydrides can be suitably chosen within a range of from about 0 to about 160 parts by weight, and preferably from about 20 to about 160 parts by weight, per 100 parts by weight of the curable copolymer according to the present invention. The amount of acid anhydrides may also be from about 0 to about 1.3 equivalents, and preferably from about 0.2 to about 1.3 equivalents, per 1 equivalent of the epoxy groups of the curable copolymer.

Such phenolic resins and acid anhydrides, if used as curing agents, are preferably used in combination with an accelerator. Though not especially limited, as long as one generally used, examples of the accelerator include diazabicycloundecene accelerators (diazabicycloalkenes); phosphorus-containing accelerators such as phosphoric esters and phosphines; and amine accelerators such as tertiary amines and quaternary ammonium salts. Exemplary diazabicycloundecene accelerators include 1,8-diazabicyclo[5.4.0]undecene-7 (DBU) and salts thereof, of which octylic acid salt, sulfonic acid salt, orthophthalic acid salt, carbolic acid salt, and other organic acid salts of 1,8-diazabicyclo[5.4.0]undecene-7 are preferred. Examples of the other accelerators include tertiary amines such as benzyldimethylamine and 2,4,6-tris(dimethylaminomethyl)phenol; imidazoles such as 2-ethyl-4-methylimidazole and 1-cyanoethyl-2-ethyl-4-methylimidazole; phosphonium salts and other phosphorus compounds containing no aromatic moiety, such as tetra-n-butylphosphonium-O,O-diethylphosphorodithioate; tertiary amine salts; quaternary ammonium salts; and metal salts such as tin octylate; and other known compounds. Additionally, organic acid salts of metals can be used in combination with the organic acid salts of diazabicycloalkenes. Exemplary organic acid salts of metals include tin octylate, zinc octylate, tin naphthenate, and zinc naphthenate. The amount of accelerators can be suitable chosen within a range of for example, from about 0 to about 3 parts by weight (e.g., from about 0.05 to about 3 parts by weight), per 100 parts by weight of the curable copolymer according to the present invention.

Examples of the curing catalysts include heat-induced cationic polymerization initiators and photo-induced cationic polymerization initiators. Each of these can be used alone or in combination. The heat-induced cationic polymerization initiators are a component that releases, through heating, a substance to initiate cationic polymerization. Exemplary heat-induced cationic polymerization initiators usable herein include aryldiazonium salts such as PP-33 [supplied by ADEKA CORPORATION]; aryliodonium salts; arylsulfonium salts such as FC-509 and FC-520 [each supplied by MINNESOTA MINING & MANUFACTURING CORPORATION], UVE 1014 [supplied by General Electric Company], CP-66 and CP-77 [each supplied by ADEKA CORPORATION], and SI-60L, SI-80L, SI-100L, and SI-110L, [each supplied by Sanshin Chemical Industry Co., Ltd.]; and allene-ion complexes such as CG-24-61 [supplied by Ciba Geigy Ltd.]. Exemplary heat-induced cationic polymerization initiators further include systems each containing both a chelate compound and a silanol or phenol, which chelate compound is a chelate of an acetoacetic acid ester or diketone with a metal such as aluminum or titanium. Exemplary chelate compounds include aluminum tris(acetylacetonate) and aluminum tris(ethyl acetoacetate). Exemplary silanols and phenols include compounds having a silanol moiety, such as triphenylsilanol; and compounds having an acidic hydroxyl group, such as bisphenol-S. The amount of heat-induced cationic polymerization initiators is, for example, from about 0 to about 20 parts by weight (e.g., 0.01 to about 20 parts by weight) per 100 parts by weight of the curable copolymer according to the present invention.

The photo-induced cationic polymerization initiator is a component that releases, upon application of active energy rays such as ultraviolet rays, a substance for initiating cation polymerization. Exemplary photo-induced cationic polymerization initiators include hexafluoroantimonate salts, pentafluorohydroxyantimonate salt, hexafluorophosphate salts, and hexafluoroarsenate salts. The amount of photo-induced cationic polymerization initiators is, for example, from about 0 to about 20 parts by weight (e.g., from about 0.01 to about 20 parts by weight) per 100 parts by weight of the curable copolymer according to the present invention.

Though not especially limited, preferred examples of the photoinitiators for the polymerization of the polymerizable unsaturated groups of the curable copolymer according to the present invention include acetophenones such as diethoxyacetophenone, 2-hydroxy-2-methyl-1-phenylpropan-1-one, 1-hydroxycyclohexyl phenyl ketone, benzyl dimethyl ketal, and 2-benzyl-2-dimethylamino-1-(4-morpholinophenyl)butan-1-one; benzophenones; benzoins; thioxanthones; biimidazoles; oximes; triazines; and acylphosphine oxide initiators. Among them, acetophenone initiators are more preferred.

Such photoinitiators can be used in combination with photoinitiator aids. Exemplary photoinitiator aids include amine photoinitiator aids such as methyl 4-dimethylaminobenzoate and 4,4'-bis(diethylamino)benzophenone; and aromatic heteroacetic acid photoinitiator aids such as phenylthioacetic acid, methylphenylthioacetic acid, dimethylphenylthioacetic acid, phenoxyacetic acid, and naphthoxyacetic acid.

The amount of photoinitiators is, for example, from about 0.1 to about 40 parts by weight, and preferably from about 1 to about 30 parts by weight, per 100 parts by weight of the total amount of the curable copolymer according to the present invention and after-mentioned radically reactive diluent.

Exemplary radically reactive diluents (diluting monomers and oligomers) include (meth)acrylic esters of aliphatic alcohols or alicyclic alcohols, such as isobornyl (meth)acrylates, cyclohexyl (meth)acrylates, and octyl (meth)acrylates; hydroxyalkyl (meth)acrylates such as 2-hydroxyethyl (meth) acrylates and 3-hydroxypropyl (meth)acrylates; glycol mono- or di-(meth)acrylates such as ethylene glycol mono- or di-(meth)acrylates, methoxyethylene glycol mono- or di-(meth)acrylates, tetramethylene glycol mono- or di-(meth) acrylates, and tripropylene glycol mono- or di-(meth)acrylates; epoxy-containing (meth)acrylates such as 3,4-epoxycyclohexylmethyl (meth)acrylates and glycidyl (meth) acrylates; and (meth)acrylates of polyols or alkylene oxide adducts thereof, such as glycerol di(meth)acrylates, trimethylolpropane tri(meth)acrylates, pentaerythritol tri- or tetra-(meth)acrylates, and dipentaerythritol hexa(meth)acrylates. Such multifunctional radically reactive diluents function as a crosslinking agent. Each of different radically reactive diluents can be used alone or in combination.

The amount of radically reactive diluents is, for example, from about 1 to about 70 percent by weight, preferably from about 5 to about 60 percent by weight, and more preferably from about 15 to about 55 percent by weight, based on the total amount of the curable copolymer according to the present invention and radically reactive diluents.

The curable resin composition according to the present invention may further contain other components according to the intended use and desired properties. Examples of the other components include resins other than those mentioned above, polyols, photosensitizers, light-activatable acid generators, fillers, colorants, pigment dispersants, antioxidants, ultraviolet-absorbers, flocculation inhibitors, flocculants, chain-transfer agents, adhesion improvers, and leveling agents.

The curable resin composition according to the present invention can be prepared by mixing and uniformly stirring the curable copolymer according to the present invention and other components, and, where necessary, filtering the mixture.

The curable resin composition according to the present invention can give cured articles [cured films such as transparent films] that excel in properties such as thermal stability, resistance to alkalis, resistance to solvents, and hardness, through curing by the application of light (such as ultraviolet rays) and/or heat. The transparent films are useful as overfilms and can be used in touch panels. Additionally, the curable resin composition can give a desired pattern by applying the composition to a base material (such as substrate), prebaking the coated film (to remove the solvent), applying light (such as ultraviolet rays) through a mask to cure exposed portions, and carrying out development by dissolving unexposed portions by the action of an alkaline aqueous solution (developer). The resulting pattern is useful typically as photo-spacers for use in liquid crystal display devices. The developer can be any of known or common developers. After the development, the patterned film is washed with water, and, where necessary, subjected to post-baking.

The curable resin compositions according to the present invention are usable as materials for the formation typically of liquid resists and dry films, as well as photo-spacers, overfilms, color resists, black matrices, and dielectric films for use in liquid crystal displays.

EXAMPLES

The present invention will be illustrated in further detail with reference to several examples below. It should be noted, however, that these examples are never construed to limit the scope of the present invention. The weight-average molecular weight and dispersion (molecular weight distribution) of a sample copolymer were measured through gel permeation chromatography (GPC) in terms of polystyrene.

(Synthesis of Copolymers)

Preparation Example 1

In a 1-liter separable flask equipped with a stirrer, thermometer, reflux condenser, dropping funnel, and nitrogen inlet tube, were charged 130 g of methoxybutyl acetate and 110 g of methoxybutanol, the mixture was raised in temperature to 80° C., a solution mixture was added dropwise thereto over 5 hours, followed by aging for further 3 hours, and thereby yielded a carboxyl-containing copolymer (P-1). The solution mixture was a solution of 85 g of methacrylic acid, 265 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 30 g of azobisdimethylvaleronitrile in 380 g of methoxybutyl acetate. The reaction was performed in a nitrogen stream. The resulting copolymer had a solids content of 35.4 percent by weight, an acid value of 158 mg KOH/g, a weight-average molecular weight (Mw) of 11200, and a molecular weight distribution of 1.96.

Preparation Example 2

In a 1-liter separable flask equipped with a stirrer, thermometer, reflux condenser, dropping funnel, and nitrogen inlet tube, were placed 130 g of methoxybutyl acetate and 110 g of methoxybutanol, the mixture was raised in temperature to 80° C., a solution mixture was added dropwise thereto over 5 hours, followed by aging for further 3 hours, and thereby yielded a carboxyl-containing copolymer (P-2). The solution mixture was a solution of 45 g of methacrylic acid, 131 g of w-carboxy-polycaprolactone monoacrylate (Aronix M5300; supplied by Toagosei Co., Ltd.), 173 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 30 g of azobisdimethylvaleronitrile in 380 g of methoxybutyl acetate. The reaction was performed in a nitrogen stream. The resulting copolymer had a solids content of 35.5 percent by weight, an acid value of 154 mg KOH/g, a weight-average molecular weight (Mw) of 11800, and a molecular weight distribution of 1.96.

Preparation Example 3

In a 1-liter separable flask equipped with a stirrer, thermometer, reflux condenser, dropping funnel, and nitrogen inlet tube, were placed 130 g of methoxybutyl acetate and 110 g of methoxybutanol, the mixture was raised in temperature to 80° C., a solution mixture was added dropwise thereto over 5 hours, followed by aging for further 3 hours, and thereby yielded a carboxyl-containing copolymer (P-3). The solution mixture was a solution of 202 g of ω-carboxy-polycaprolactone monoacrylate (Aronix M5300; supplied by Toagosei Co., Ltd.), 148 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 30 g of azobisdimethylvaleronitrile in 380 g of methoxybutyl acetate. The reaction was performed in a nitrogen stream. The resulting copolymer had a solids content of 35.5 percent by weight, an acid value of 108 mg KOH/g, a weight-average molecular weight (Mw) of 12100, and a molecular weight distribution of 1.98.

Preparation Example 4

In a 1-liter separable flask equipped with a stirrer, thermometer, reflux condenser, dropping funnel, and nitrogen inlet tube, were placed 125 g of methoxybutyl acetate and 110 g of methoxybutanol, the mixture was raised in temperature to 80° C., a solution mixture was added dropwise thereto over 5 hours, followed by aging for further 3 hours, and thereby yielded a carboxyl-containing copolymer (P-4). The solution mixture was a solution of 104 g of methacrylic acid, 90 g of cyclohexylmaleimide, 156 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 35 g of azobisdimethylvaleronitrile in 380 g of methoxybutyl acetate. The reaction was performed in a nitrogen stream. The resulting copolymer had a solids content of 35.9 percent by weight, an acid value of 194 mg KOH/g, a weight-average molecular weight (Mw) of 9200, and a molecular weight distribution of 2.09.

Preparation Example 5

In a 1-liter separable flask equipped with a stirrer, thermometer, reflux condenser, dropping funnel, and nitrogen inlet tube, were placed 140 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-5). The solution mixture used herein was a solution of 92 g of acrylic acid, 46 g of cyclohexylmaleimide, 45 g of benzyl methacrylate, 168 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 20 g of azobisdimethylvaleronitrile in 380 g of methoxybutyl acetate. The resulting copolymer had a solids content of 35.5 percent by weight, an acid value of 204 mg KOH/g, a weight-average molecular weight (Mw) of 15000, and a molecular weight distribution of 2.00.

Preparation Example 6

In a 1-liter separable flask equipped with a stirrer, thermometer, reflux condenser, dropping funnel, and nitrogen inlet tube, were placed 135 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-6). The solution mixture used herein was a solution of 395 g of methacrylic acid, 148 g of ω-carboxy-polycaprolactone monoacrylate (Aronix M5300; supplied by Toagosei Co., Ltd.), 61 g of phenylmaleimide, 101 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 25 g of azobisdimethylvaleronitrile in 380 g of methoxybutyl acetate. The resulting copolymer had a solids content of 35.7 percent by weight, an acid value of 153 mg KOH/g, a weight-average molecular weight (Mw) of 11000, and a molecular weight distribution of 1.90.

Preparation Example 7

In a 1-liter separable flask equipped with a stirrer, thermometer, reflux condenser, dropping funnel, and nitrogen inlet tube, were placed 120 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-7). The solution mixture used herein was a solution of 226 g of ω-carboxy-polycaprolactone monoacrylate (Aronix M5300; supplied by Toagosei. Co., Ltd.), 49 g of cyclohexylmaleimide, 101 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 40 g of azobisdimethylvaleronitrile in 380 g of methoxybutyl acetate. The resulting copolymer had a solids content of 36.0 percent by weight, an acid value of 120 mg KOH/g, a weight-average molecular weight (Mw) of 7500, and a molecular weight distribution of 1.88.

Preparation Example 8

In a 1-liter separable flask equipped with a stirrer, thermometer, reflux condenser, dropping funnel, and nitrogen inlet tube, were placed 135 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-8). The solution mixture used herein was a solution of 99 g of methacrylic acid, 72 g of ω-carboxy-polycaprolactone monoacrylate (Aronix M5300; supplied by Toagosei Co., Ltd.), 92 g of styrene, 88 g of a 50:50 (by mole) mixture of 3,4-epoxytricyclo[5.2.1.0$^{2,6}$]dec-9-yl acrylate and 3,4-epoxytricyclo[5.2.1.0$^{2,6}$]dec-8-yl acrylate [compounds of Formula (9) wherein Ra' is H], and 25 g of azobisdimethylvaleronitrile in 380 g of methoxybutyl acetate. The resulting copolymer had a solids content of 35.6 percent by weight, an acid value of 222 mg KOH/g, a weight-average molecular weight (Mw) of 13500, and a molecular weight distribution of 1.93.

Preparation Example 9

In a 1-liter separable flask equipped with a stirrer, thermometer, reflux condenser, dropping funnel, and nitrogen inlet tube, were placed 130 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-9). The solution mixture used herein was a solution of 63 g of acrylic acid, 66 g of ω-carboxy-polycaprolactone monoacrylate (Aronix M5300; supplied by Toagosei Co., Ltd.), 135 g of benzyl methacrylate, 87 g of a 50:50 (by mole) mixture of 2-(3,4-epoxytricyclo[5.2.1.0$^{2,6}$]dec-9-yloxy)ethyl acrylate and 2-(3,4-epoxytricyclo[5.2.1.0$^{2,6}$]dec-8-yloxy)ethyl acrylate [compounds of Formula (10) wherein Ra' is H], and 30 g of azobisdimethylvaleronitrile in 380 g of methoxybutyl acetate. The resulting copolymer had a solids content of 35.6 percent by weight, an acid value of 175 mg KOH/g, a weight-average molecular weight (Mw) of 8800, and a molecular weight distribution of 1.83.

Preparation Example 10

In a 1-liter separable flask equipped with a stirrer, thermometer, reflux condenser, dropping funnel, and nitrogen inlet tube, were placed 130 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-10). The solution mixture used herein was a solution of 197 g of ω-carboxy-polycaprolactone monoacrylate (Aronix M5300; supplied by Toagosei Co., Ltd.), 89 g of phenylmaleimide, 64 g of a 50:50 (by mole) mixture of 2-(3,4-epoxytricyclo[5.2.1.0$^{2,6}$]dec-9-yloxy)ethyl acrylate and 2-(3,4-epoxytricyclo[5.2.1.0$^{2,6}$]dec-8-yloxy)ethyl acrylate [compounds of Formula (10) wherein Ra' is H], and 30 g of azobisdimethylvaleronitrile in 380 g of methoxybutyl acetate. The resulting copolymer had a solids content of 35.7 percent by weight, an acid value of 105 mg KOH/g, a weight-average molecular weight (Mw) of 8700, and a molecular weight distribution of 1.87.

Preparation Example 11

Used in Comparative Example 1

In a 1-liter separable flask equipped with a stirrer, thermometer, reflux condenser, dropping funnel, and nitrogen inlet tube, were placed 120 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-11). The solution mixture used herein was a solution of 84 g of methacrylic acid, 132 g of cyclohexylmaleimide, 134 g of 3,4-epoxycyclohexylmethyl acrylate (CYCLOMER A400; supplied by Daicel Chemical Industries, Ltd.), and 40 g of azobisdimethylvaleronitrile in 380 g of methoxybutyl acetate. The resulting copolymer had a solids content of 36.2 percent by weight, an acid value of 157 mg KOH/g, a weight-average molecular weight (Mw) of 6700, and a molecular weight distribution of 1.97.

Preparation Example 12

Used in Comparative Example 2

In a 1-liter separable flask equipped with a stirrer, thermometer, reflux condenser, dropping funnel, and nitrogen inlet tube, were placed 125 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-12). The solution mixture used herein was a solution of 204 g of ω-carboxy-polycaprolactone monoacrylate (Aronix M5300; supplied by Toagosei Co., Ltd.), 53 g of styrene, 93 g of 3,4-epoxycyclohexylmethyl acrylate (CYCLOMER A400; supplied by Daicel Chemical Industries, Ltd.), and 35 g of azobisdimethylvaleronitrile in 380 g of methoxybutyl acetate. The resulting copolymer had a solids content of 35.9 percent by weight, an acid value of 109 mg KOH/g, a weight-average molecular weight (Mw) of 8600, and a molecular weight distribution of 1.91.

Preparation Example 13

Used in Comparative Example 3

In a 1-liter separable flask equipped with a stirrer, thermometer, reflux condenser, dropping funnel, and nitrogen inlet tube, were placed 140 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-13). The solution mixture used herein was a solution of 84 g of acrylic acid, 89 g of phenylmaleimide, 177 g of 3,4-epoxycyclohexylmethyl methacrylate (CYCLOMER M100; supplied by Daicel Chemical Industries, Ltd.), and 20 g of azobisdimethylvaleronitrile in 380 g of methoxybutyl acetate. The resulting copolymer had a solids content of 35.3 percent by weight, an acid value of 186 mg KOH/g, a weight-average molecular weight (Mw) of 15600, and a molecular weight distribution of 1.97.

Preparation Example 14

Used in Comparative Example 4

In a 1-liter separable flask equipped with a stirrer, thermometer, reflux condenser, dropping funnel, and nitrogen inlet tube, were placed 130 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-14). The solution mixture used herein was a solution of 58 g of methacrylic acid, 78 g of ω-carboxy-polycaprolactone monoacrylate (Aronix M5300; supplied by Toagosei Co., Ltd.), 91 g of benzyl methacrylate, 122 g of 3,4-epoxycyclohexylmethyl methacrylate (CYCLOMER M100; supplied by Daicel Chemical Industries, Ltd.), and 30 g of azobisdimethylvaleronitrile in 380 g of methoxybutyl acetate. The resulting copolymer had a solids content of 35.6 percent by weight, an acid value of 150 mg KOH/g, a weight-average molecular weight (Mw) of 8400, and a molecular weight distribution of 1.95.

Preparation Example 15

Used in Comparative Example 5

In a 1-liter separable flask equipped with a stirrer, thermometer, reflux condenser, dropping funnel, and nitrogen inlet tube, were placed 135 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-15). The solution mixture used herein was a solution of 84 g of methacrylic acid, 151 g of phenylmaleimide, 115 g of 4-hydroxybutyl acrylate glycidyl ether (4HBAGE; supplied by Nippon Kasei Chemical Co., Ltd.), and 25 g of azobisdimethylvaleronitrile in 380 g of methoxybutyl acetate. The resulting copolymer had a solids content of 35.4 percent by weight, an acid value of 156 mg KOH/g, a weight-average molecular weight (Mw) of 10200, and a molecular weight distribution of 1.82.

Preparation Example 16

Used in Comparative Example 6

In a 1-liter separable flask equipped with a stirrer, thermometer, reflux condenser, dropping funnel, and nitrogen inlet tube, were placed 125 g of methoxybutyl acetate and 110 g of methoxybutanol, the mixture was raised in temperature to 80° C., subjected to polymerization by the procedure of Preparation Example 1, except for using another solution mixture, and thereby yielded a carboxyl-containing copolymer (P-16). The solution mixture used herein was a solution of 200 g of ω-carboxy-polycaprolactone monoacrylate (Aronix M5300; supplied by Toagosei Co., Ltd.), 10.6 g of cyclohexylmaleimide, 44 g of 4-hydroxybutyl acrylate glycidyl ether (4HBAGE; supplied by Nippon Kasei Chemical Co., Ltd.), and 35 g of azobisdimethylvaleronitrile in 380 g of methoxybutyl acetate. The resulting copolymer had a solids content of 35.8 percent by weight, an acid value of 107 mg KOH/g, a weight-average molecular weight (Mw) of 9100, and a molecular weight distribution of 1.90.

(Synthesis of Curable Copolymers)

Example 1

The resin solution (P-1) prepared in Preparation Example 1 was combined with 47 g of glycidyl methacrylate, 7 g of 1,8-diazabicyclo[5.4.0]undecene-7 (DBU), and 3 g of methoquinone, the mixture was subjected to a reaction at 75° C. for 10 hours, and thereby yielded a photo- and/or thermo-curable resin solution. The reaction was performed in a stream of gaseous mixture of 7 percent by volume of oxygen and 93 percent by volume of nitrogen. The results are shown in Table 1. Table 1 shows the solids content (NV; nonvolatile matter) of the resulting curable resin solution; the acid value, weight-average molecular weight, and molecular weight distribution of the curable resin (curable copolymer); and the results of evaluation tests mentioned below.

Example 2

The resin solution (P-2) prepared in Preparation Example 2 was combined with 37 g of glycidyl methacrylate, 7 g of 1,8-diazabicyclo[5.4.0]undecene-7 (DBU), and 3 g of methoquinone, the mixture was subjected to a reaction at 75° C. for 10 hours, and thereby yielded a photo- and/or thermo-curable resin solution. The reaction was performed in a stream of gaseous mixture of 7 percent by volume of oxygen and 93 percent by volume of nitrogen. The results are shown in Table 1.

Example 3

The resin solution (P-3) prepared in Preparation Example 3 was combined with 38 g of glycidyl methacrylate, 7 g of 1,8-diazabicyclo[5.4.0]undecene-7 (DBU), and 3 g of methoquinone, the mixture was subjected to a reaction at 75° C. for 10 hours, and thereby yielded a photo- and/or thermo-curable resin solution. The reaction was performed in a stream of gaseous mixture of 7 percent by volume of oxygen and 93 percent by volume of nitrogen. The results are shown in Table 1.

Example 4

The resin solution (P-4) prepared in Preparation Example 4 was combined with 52 g of glycidyl methacrylate, 7 g of 1,8-diazabicyclo[5.4.0]undecene-7 (DBU), and 3 g of methoquinone, the mixture was subjected to a reaction at 75° C. for 10 hours, and thereby yielded a photo- and/or thermo-curable resin solution. The reaction was performed in a stream of gaseous mixture of 7 percent by volume of oxygen and 93 percent by volume of nitrogen. The results are shown in Table 1.

Example 5

The resin solution (P-4) prepared in Preparation Example 4 was combined with 73 g of 4-hydroxybutyl acrylate glycidyl ether (4HBAGE; supplied by Nippon Kasei Chemical Co., Ltd.), 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 6

The resin solution (P-5) prepared in Preparation Example 5 was combined with 52 g of glycidyl methacrylate, 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 7

The resin solution (P-5) prepared in Preparation Example 5 was combined with 139 g of 3,4-epoxycyclohexylmethyl acrylate (CYCLOMER A400; supplied by Daicel Chemical Industries, Ltd.), 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 8

The resin solution (P-6) prepared in Preparation Example 6 was combined with 38 g of glycidyl methacrylate, 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 9

The resin solution (P-6) prepared in Preparation Example 6 was combined with 52 g of 3,4-epoxycyclohexylmethyl methacrylate (CYCLOMER M100; supplied by Daicel Chemical Industries, Ltd.), 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 10

The resin solution (P-7) prepared in Preparation Example 7 was combined with 29 g of glycidyl methacrylate, 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 11

The resin solution (P-8) prepared in Preparation Example 8 was combined with 87 g of glycidyl methacrylate, 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 12

The resin solution (P-9) prepared in Preparation Example 9 was combined with 93 g of glycidyl methacrylate, 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Example 13

The resin solution (P-10) prepared in Preparation Example 10 was combined with 31 g of glycidyl methacrylate, 7 g of 1,8-diazabicyclo[5.4.0]undecene-7 (DBU), and 3 g of methoquinone, from which a photo- and/or thermo-curable resin solution was prepared by the procedure of Example 1. The results are shown in Table 1.

Comparative Example 1

The resin solution (P-11) prepared in Preparation Example 11 was combined with 52 g of glycidyl methacrylate, 7 g of 1,8-diazabicyclo[5.4.0]undecene-7 (DBU), and 3 g of methoquinone, and synthesis was performed by the procedure of Example 1. The results are shown in Table 1.

Comparative Example 2

The resin solution (P-12) prepared in Preparation Example 12 was combined with 36 g of glycidyl methacrylate, 7 g of 1,8-diazabicyclo[5.4.0]undecene-7 (DBU), and 3 g of methoquinone, and synthesis was performed. The results are shown in Table 1.

Comparative Example 3

The resin solution (P-13) prepared in Preparation Example 13 was combined with 55 g of glycidyl methacrylate, 7 g of 1,8-diazabicyclo[5.4.0]undecene-7 (DBU), and 3 g of methoquinone, and synthesis was performed. The results are shown in Table 1.

Comparative Example 4

The resin solution (P-14) prepared in Preparation Example 14 was combined with 55 g of glycidyl methacrylate, 7 g of 1,8-diazabicyclo[5.4.0]undecene-7 (DBU), and 3 g of methoquinone, and synthesis was performed. The results are shown in Table 1.

Comparative Example 5

The resin solution (P-15) prepared in Preparation Example 15 was combined with 53 g of glycidyl methacrylate, 7 g of 1,8-diazabicyclo[5.4.0]undecene-7 (DBU), and 3 g of methoquinone, and synthesis was performed. The results are shown in Table 1.

Comparative Example 6

The resin solution (P-16) prepared in Preparation Example 16 was combined with 32 g of glycidyl methacrylate, 7 g of 1,8-diazabicyclo[5.4.0]undecene-7 (DBU), and 3 g of methoquinone, and synthesis was performed. The results are shown in Table 1.

(Evaluations of Curable Copolymers)

(1) Evaluation of Synthetic Stability

The synthetic stability was evaluated in the following manner. Among samples prepared in Examples 1 to 13 and Comparative Examples 1 to 6, samples which suffered from gelation during synthesis through addition reaction of epoxy monomers are indicated by "gelated" in the evaluation of synthetic stability in Table 1. Independently, the curable resins prepared in Examples 1 to 13 and Comparative Examples 2 and 4 were subjected to gel permeation chromatographic (GPC) measurements, and their synthetic stability was determined based on their molecular weight distributions. Specifically, a sample having a molecular weight distribution of 2.5 or less was evaluated as "A" (excellent), one having a molecular weight distribution of 2.6 to 3.5 was evaluated as "B" (good), and one having molecular weight distribution of more than 3.5 was evaluated as "C" (inferior).

(2) Evaluation of Storage Stability

The storage stability was evaluated in the following manner. The curable resin solutions prepared in Examples 1 to 13 and Comparative Examples 2 and 4 immediately after the preparation were subjected to viscosity measurement, stored at 23° C. for 3 months, and then subjected to viscosity measurement again. A sample having an increase in viscosity after storage at room temperature for 3 months of less than 10% was evaluated as "A" (excellent); one having an increase in viscosity of 10% or more and less than 30% was evaluated as "B" (good); and one having an increase in viscosity of 30% or more was evaluated as "C" (inferior). The viscosity measurements were conducted with a Brookfield type viscometer after adjusting the temperatures of the samples to 23° C.

(Preparation of Curable Resin Compositions and Cured Articles)

Example 14

A composition solution was prepared by diluting 100 g of the curable resin solution (curable copolymer solution) prepared in Example 1 with 50 g of propylene glycol monomethyl ether, adding thereto 20 g of dipentaerythritol hexaacrylate, 10 g of a cresol novolac epoxy resin ("EPICLON N-695" supplied by DIC Corporation), and 7 g of benzyl methyl ketal, and filtrating the resulting mixture through a filter with pore size of 0.2 μm. The resulting composition solution was subjected to evaluation tests according to the following procedures.

(1) Evaluation of Resistance to Alkalis

The composition solution was applied to a glass substrate and prebaked at 80° C. for 5 minutes to give a coating about 5 μm thick. The coating was cured by irradiation from a high-pressure mercury lamp at an irradiance of 120 W/cm from a height of 10 cm at a line speed of 30 m/min., heated at 200° C. for 20 minutes to give a test coating (test piece). The prepared test piece was immersed in a 10 percent by mass aqueous sodium hydroxide solution for 1 hour, and how the coating was and how it adhered to the substrate was totally evaluated. The criteria are as follows. The result is shown in Table 2.

A (Excellent): No change is observed
B (Good): Only little change is observed
C (Inferior): Dissolution or blistering occurs in part of the coating
D (Very inferior): Dissolution or blistering/delamination occurs in the entire coating (2) Evaluation of Resistance to Solvents The substrate bearing a coating prepared for the alkali resistance test was immersed in methyl ethyl ketone at room temperature for 30 minutes, and how the interface of the immersed portion and how the coating in the immersed portion was visually observed. The evaluation criteria are as follows. The result is shown in Table 2.

A (Excellent): No change is observed
B (Good): Only little change is observed
C (Inferior): The coating is dissolved and the interface is exposed
D (Very inferior): The coating is markedly reduced in its thickness (3) Evaluation of Hardness The test piece was prepared according to the same procedure as in the alkali resistance test and its surface hardness was determined by measuring the pencil hardness of the coating through scratching according to the pencil scratch test specified in Japanese Industrial Standards (JIS) K-5400-1990, Section 8.4.1. The result is shown in Table 2.

Examples 15 to 26

Composition solutions were prepared and their properties were evaluated by the procedure of Example 14, except for using the curable copolymer solutions prepared in Examples 2 to 13, respectively. The results are shown in Table 2.

Comparative Examples 7 to 12

Composition solutions were prepared and their properties were evaluated by the procedure of Example 14, except for using the resin solutions prepared in Preparation Examples 1, 8, 11, and 16, and the curable copolymer solutions prepared in Comparative Examples 2 and 4, respectively. The results are shown in Table 2.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Properties | NV | 37.5 | 33.4 | 37.0 | 37.8 | 39.0 | 41.0 | 42.6 | 37.0 | 37.9 | 36.5 | 39.8 |
|  | Acid value (dry) | 93.0 | 101.5 | 58.4 | 118.4 | 112.5 | 62.3 | 58.4 | 99.7 | 96 | 81 | 99 |
|  | Mw | 12000 | 12100 | 12600 | 9700 | 9900 | 16500 | 16800 | 12200 | 14300 | 8300 | 14300 |
|  | Mw/Mn | 2.2 | 2.2 | 2.3 | 2.3 | 2.3 | 2.2 | 2.1 | 2.2 | 2.5 | 2.1 | 2.1 |
| Evaluations of copolymer | Synthetic stability | A | A | A | A | A | A | A | A | A | A | A |
|  | Storage stability | B | B | A | B | A | A | A | A | A | A | B |

|  |  | Ex. 12 | Ex. 13 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|
| Properties | NV | 40.2 | 36.6 | — | 36.9 | — | 38.0 | — | — |
|  | Acid value (dry) | 55 | 65 | — | 35 | — | 40 | — | — |
|  | Mw | 12200 | 9300 | — | 76200 | — | 62800 | — | — |
|  | Mw/Mn | 2.3 | 2.1 | — | 16.9 | — | 14.3 | — | — |

TABLE 1-continued

| | | | | | | | | | | |
|---|---|---|---|---|---|---|---|---|---|---|
| Evaluations of copolymer | Synthetic stability | A | A | gelated | C | gelated | C | gelated | gelated |
| | Storage stability | A | A | — | D | — | D | — | — |

TABLE 2

| | | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| Used resin | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| Evaluations of composition | Alkali resistance | A | A | A | A | A | A | A | A | A | A | A |
| | Solvent resistance | A | A | A | A | A | A | A | A | A | A | A |
| | Hardness | 6H | 6H | 6H | 6H | 6H | 4H | 4H | 4H | 4H | 4H | 6H |

| | | Ex. 25 | Ex. 26 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|
| Used resin | | Ex. 12 | Ex. 13 | Prep. Ex. 1 | Prep. Ex. 8 | Prep. Ex. 11 | Prep. Ex. 16 | Com. Ex. 2 | Com. Ex. 4 |
| Evaluations of composition | Alkali resistance | A | A | B | C | C | D | A | A |
| | Solvent resistance | A | A | B | B | D | D | B | C |
| | Hardness | 6H | 6H | 4H | 2H | H | H | 4H | 4H |

INDUSTRIAL APPLICABILITY

The curable resin compositions according to the present invention give, through curing, cured articles which excel in resistance to alkalis and solvents and have a high hardness. They are therefore advantageously used typically in solder resists for printed wiring assemblies, resists for optical waveguides, liquid resists, and dry films, as well as photospacers, overfilms, color resists, black matrices, and dielectric films for use in liquid crystal displays.

The invention claimed is:

1. A photo- and/or thermo-curable copolymer having polymerizable unsaturated groups in side chains, which is obtainable by reacting a copolymer (P) with an epoxy-containing polymerizable unsaturated compound (C), the copolymer (P) containing monomer units derived from a carboxyl-containing polymerizable unsaturated compound (A) and monomer units derived from at least one selected from epoxy-containing polymerizable unsaturated compounds (B) represented by following Formulae (1) and (2):

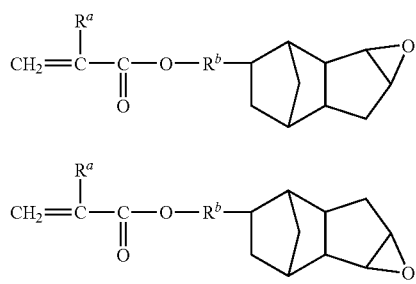

wherein $R^a$s each represent a hydrogen atom or a hydroxyl-substituted or -unsubstituted alkyl group having 1 to 4 carbon atoms; and $R^b$s each represent a single bond or an alkylene group having 1 to 18 carbon atoms which may contain heteroatom(s), wherein the epoxy group of the epoxy-containing polymerizable unsaturated compound (C) has been added to part of the carboxyl groups of the copolymer (P).

2. The photo- and/or thermo-curable copolymer according to claim 1, wherein the copolymer (P) further contains monomer units derived from a carboxyl- and epoxy-free polymerizable unsaturated compound (D), in addition to the monomer units derived from the carboxyl-containing polymerizable unsaturated compound (A) and the monomer units derived from the at least one epoxy-containing polymerizable unsaturated compound (B).

3. The photo- and/or thermo-curable copolymer according to claim 2, wherein the carboxyl- and epoxy-free polymerizable unsaturated compound (D) is at least one polymerizable unsaturated compound selected from the group of monomers consisting of (D1) styrene which may be substituted with alkyl or hydroxyl, (D2) an unsaturated carboxylic acid ester represented by following Formula (3):

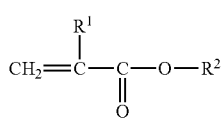

wherein $R^1$ represents a hydrogen atom or an alkyl group having 1 to 7 carbon atoms; $R^2$ represents one selected from a linear or branched-chain alkyl group having 1 to 18 carbon atoms, an alkenyl group having 2 to 18 carbon atoms, an aryl group, an aralkyl group, a $-(R^3-O)_m-R^4$ group (wherein $R^3$ represents a bivalent hydrocarbon group having 1 to 12 carbon atoms, $R^4$ represents hydrogen atom or a hydrocarbon group, and "m" denotes an integer of 1 or more), and a group with a monocyclic or polycyclic structure containing five or more members, and (D3) a N-substituted maleimide represented by following Formula (4):

[Chemical Formula 3]

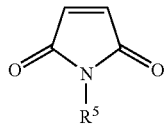

(4)

wherein $R^5$ represents one selected from a substituted or unsubstituted phenyl group, a substituted or unsubstituted aralkyl group, and a substituted or unsubstituted cycloalkyl group.

4. A curable resin composition comprising the photo- and/or thermo-curable copolymer of any one of claims 1 to 3.

5. The curable resin composition according to claim 4, further comprising a curing agent and/or a curing catalyst.

6. A cured article prepared through curing of the curable resin composition of claim 4.

* * * * *